United States Patent
Tanaka

(10) Patent No.: US 8,448,091 B2
(45) Date of Patent: May 21, 2013

(54) INFORMATION PROCESSOR AND RECORDING MEDIUM

(75) Inventor: Shinichi Tanaka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 935 days.

(21) Appl. No.: 12/142,830

(22) Filed: Jun. 20, 2008

(65) Prior Publication Data

US 2009/0024961 A1    Jan. 22, 2009

(30) Foreign Application Priority Data

Jul. 19, 2007   (JP) .................................. 2007-188865

(51) Int. Cl.
*G06F 3/14*   (2006.01)
*G06F 3/17*   (2006.01)

(52) U.S. Cl.
USPC ........... 715/835; 715/716; 715/839; 717/174; 345/760; 348/207.99; 358/1.15

(58) Field of Classification Search .......... 715/200–277, 715/700–867; 700/701–866; 709/201–229; 705/50–79; 345/30–111, 760; 707/200–206; 348/206–231.9; 717/174; 358/1.15
See application file for complete search history.

(56) References Cited

U.S. PATENT DOCUMENTS

| | | | | |
|---|---|---|---|---|
| 6,002,401 A * | 12/1999 | Baker | | 715/839 |
| 6,278,455 B1 * | 8/2001 | Baker | | 715/716 |
| 7,861,241 B2 * | 12/2010 | Kumagai et al. | | 717/174 |
| 2002/0005866 A1 * | 1/2002 | Gorham et al. | | 345/760 |
| 2009/0167876 A1 * | 7/2009 | Ueda et al. | | 348/207.99 |
| 2011/0310435 A1 * | 12/2011 | Tsuji et al. | | 358/1.15 |

FOREIGN PATENT DOCUMENTS

WO   2005/109157   11/2005

OTHER PUBLICATIONS

Japanese Office Action dated Mar. 5, 2013, from corresponding Japanese Application No. 2010-253924.

* cited by examiner

*Primary Examiner* — Ruay Ho
(74) *Attorney, Agent, or Firm* — Katten Muchin Rosenman LLP

(57) ABSTRACT

An icon processor acquires a first icon image from a recording medium. A menu screen creator creates on a default background image a menu screen in which the first icon and another icon image are arranged. When an input receiving unit receives operation information indicating an operation for selecting the first icon image is performed, a background image processor directs the menu screen creator to switch the default background image to a first background image acquired from the recording medium. When the input receiving unit receives operation information indicating an operation for determining the first icon image is performed, the background image processor directs the menu screen creator to switch the first background image to a second background image acquired from the recording medium.

5 Claims, 10 Drawing Sheets

INFORMATION PROCESSOR AND RECORDING MEDIUM

BACKGROUND OF THE INVENTION

1. Field of the Invention

The present invention relates to an information processing technique executed in an information processor, such as a game device.

2. Description of the Related Art

Conventionally, a menu screen has been proposed in which multiple functional icons and multiple medium icons are arranged two-dimensionally in order to improve operability of a user interface in International Patent Publication WO 2005/109157 Pamphlet.

As various types of game software have been developed, game makers make efforts to introduce new software to users by distributing trial versions of software free of charge, as well as by placing advertisements thereof on TV. With development of the Internet, it recently has become possible for users to download game software from virtual game software shops via the Internet, and there have started new attempts to acquire new users by distributing trial versions of software from such virtual game shops.

At present, game software are already circulated in forms of recording media, such as optical disks and magneto-optical disks. Therefore, storing trial versions of software for sales promotion in the recording media of game software can distribute trial versions of software to users who bought the game software at a same time, which can provide game makers with a great sales promotion advantage. The above way is considered to be very effective as a realistic sales promotion tool, especially because a disk has a memory capacity enough to record a trial version of software for sales promotion due to a large-scale of disk capacity.

In indicating a user that there is a trial version of software in a recording medium of game software, it is preferable that an image capable of attracting the user's interest is provided to a display. Thereby, it is expected that a user installs or executes the trial version of software while maintaining his/her interest. Provision of an attracting image is favorable in a case where only a trial version of software is stored in a recording medium, as well as in the case where game software and a trial version of software are stored therein.

SUMMARY OF THE INVENTION

In view of these circumstances, a general purpose of the present invention is to provide a technique in which presence of application software can be effectively notified to a user.

To solve the above challenge, an information processor of one embodiment of the present invention includes: an input receiving unit which receives operation information by a user; an icon processor which acquires a first icon image; a background image processor which acquires a background image; and a menu screen creator which creates on a certain default background image a menu screen in which the first icon image and another icon image, which can be processed by the information processor, are arranged. When the input receiving unit receives operation information indicating an operation for selecting the first icon image is performed on a menu screen, the background image processor directs the menu screen creator to switch the default background image to a first background image acquired by the background image processor, and, when the input receiving unit receives operation information indicating an operation for determining the first icon image is performed on the menu screen, the background image processor directs the menu screen creator to switch the first background image to a second background image acquired by the background image processor.

Another embodiment of the present invention is a recording medium which is placed in a drive device to be readable by a computer. In the recording medium, recording regions are formed in which: a first icon image indicating the presence of application software, a file or data; a first background image which is used as a background image when an operation for selecting the first icon image is performed while the first icon image is being displayed on the display by a computer; a second icon image which identifies application software, a file or data; and a second background image which is used instead of the first background image when the first icon image and the second icon image are displayed on the display when an operation for determining the first icon image on the display is performed, are recorded, respectively.

Note that any combination of the aforementioned components or any manifestation of the present invention realized by modification of a method, device, system, recording medium, computer program, and so forth, is effective as an embodiment of the present invention.

DETAILED DESCRIPTION OF THE INVENTION

The invention will now be described by reference to the preferred embodiments. This does not intend to limit the scope of the present invention, but to exemplify the invention.

Figure 1:
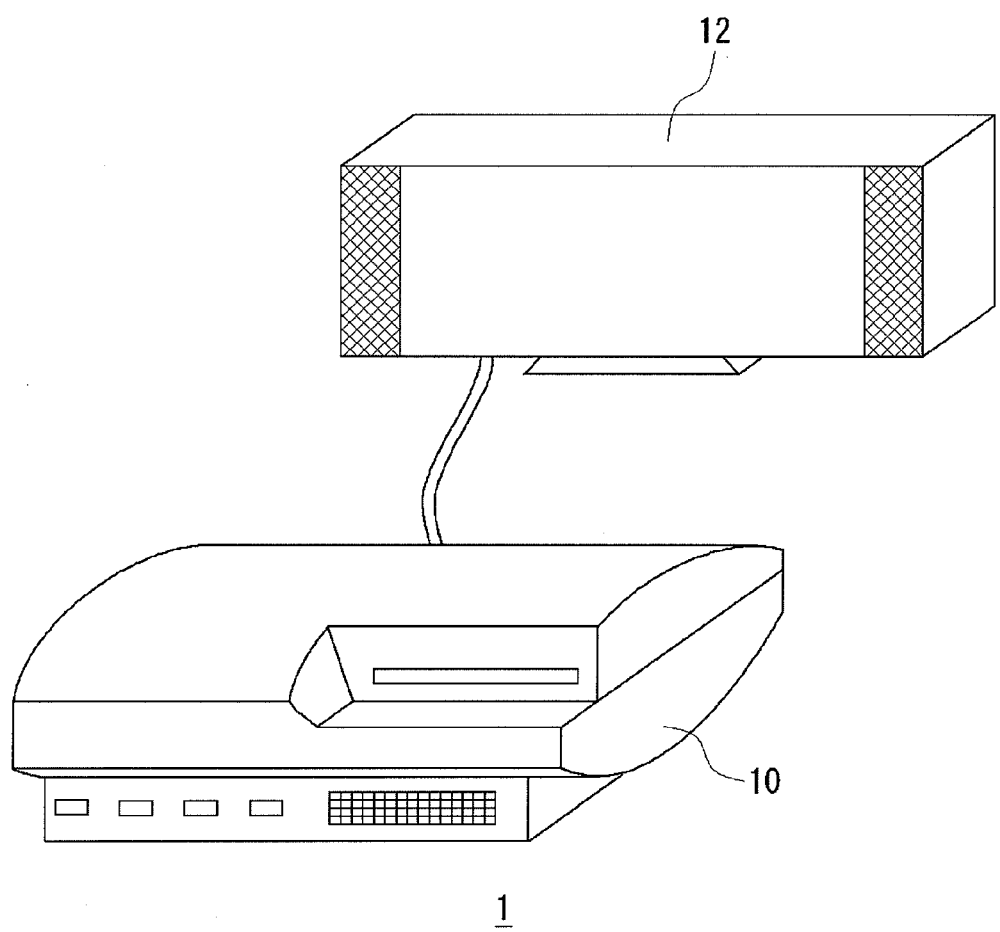
FIG. 1 is a diagram illustrating an environment where a game system according to an embodiment of the present invention is used.

FIG. 1 illustrates an environment where a game system according to an embodiment of the present invention is used. The game system 1 includes: a game device 10 which executes game software; and an output device 12 which outputs a processing result processed by the game device 10. The output device 12 may be a TV set having a display which outputs an image and a speaker which outputs sound. The output device 12 may be connected to the game device 10 with a wire cable, or with a wireless connection by a wireless LAN (Local Area Network) or the like.

The game device 10 is a information processor which processes game software and creates an image signal and a sound signal indicating results of the game software being processed. The output device 12 outputs an image signal and a sound signal created by the game device 10. The technique shown in the present embodiment can be practiced in an information processor which executes another kind of application and makes the output device 12 display an image, without being limited to the game device 10. The information processor may be any one which can install application software from a media drive in which a recording medium is placed, into a recording device such as a hard disk. In the present embodiment, the game system 1 executing a game is illustrated; however, a system executing another application may be possible.

Figure 2:
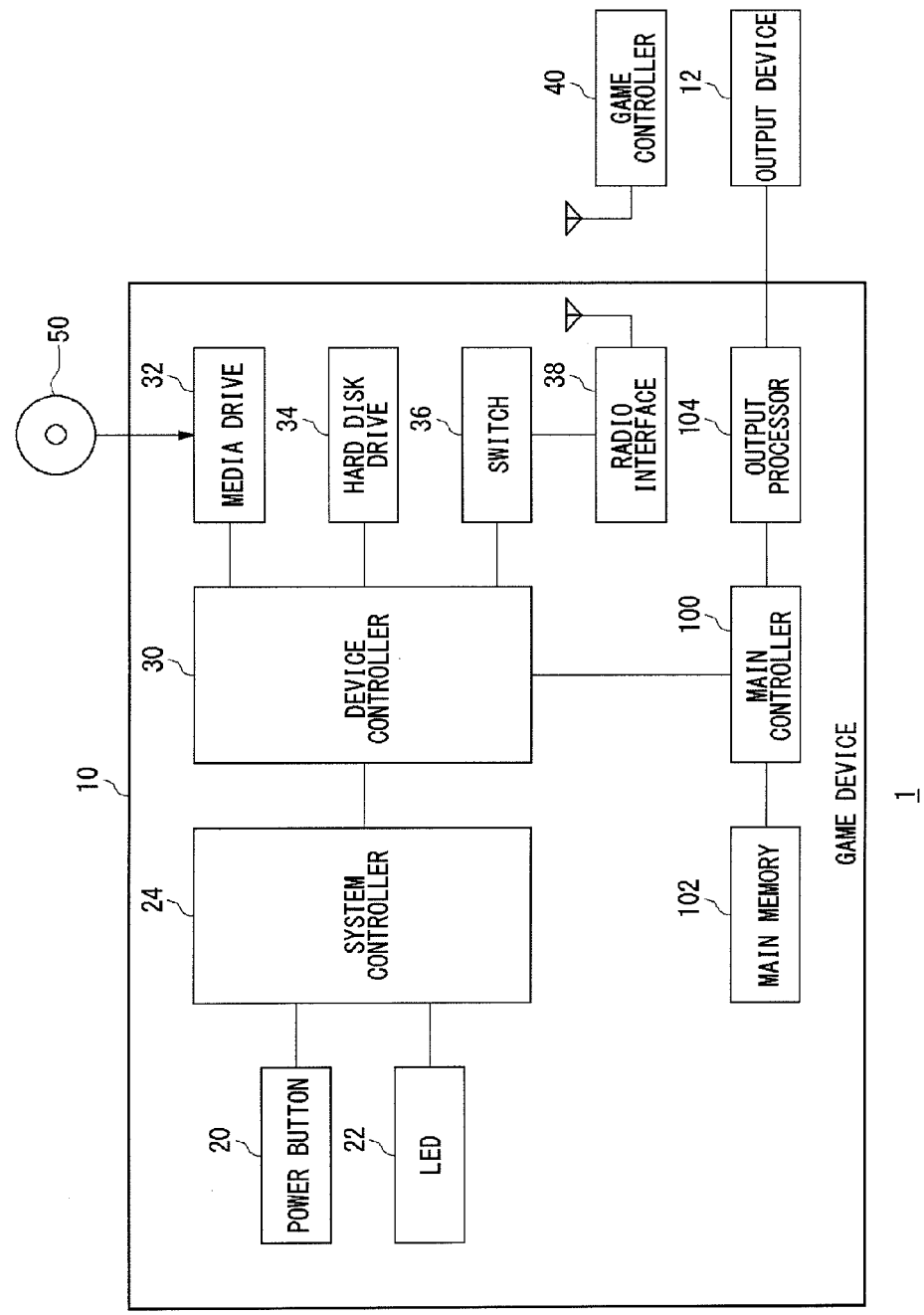
FIG. 2 is a diagram illustrating a functional block of a game device.

FIG. 2 illustrates a functional block of the game device 10. The game device 10 comprises a power button 20, an LED 22, a system controller 24, a device controller 30, a media drive 32, a hard disk drive 34, a switch 36, a radio interface 38, a main controller 100, a main memory 102, and an output processor 104.

The power button 20 is an input unit where a user's input for operation is performed and is operated so that a power supply to the game device 10 is turned on or off. The power button 20 may be a press type button and turning on or off of a power supply may be controlled by pressing the button 20. The power button 20 may have another structure such as a touch sensor, with which a user can turn on or off a power supply. The LED 22 indicates a state of turning on or off of a power supply by lighting. The system controller 24 detects whether the power button 20 is pressed. When detecting transition from the state of turning off a power supply to the state of the power button 20 being pressed, the system controller 24 controls the lighting of the LED 22, as well as starting the main controller 100 a boot sequence of the operating system. When a power cable is plugged into the game device 10, the system controller 24 keeps itself in the stand-by mode to monitor whether the power button 20 is pressed, even if a power supply is turned off.

A device controller 30 is structured as an LSI (Large-Scale Integrated Circuit) which executes transferring information between devices, like a south bridge. As illustrated, the device controller 30 is connected to a system controller 24, a media drive 32, a hard disk drive 34, a switch 36, and a main controller 100, etc. The device controller 30 absorbs differences in electrical characteristics and in data transfer speeds of each device, and controls a timing of data transfer. The hard disk drive 34 writes/reads data by driving the built-in hard disk.

The media drive 32 recognizes, when a recording medium 50 in which game software is recorded is placed, the recording medium 50 by driving it, and reads out necessary data from the recording medium 50. The recording medium 50 may be a medium such as an optical disk or an optical magnetic disk. The game software at least includes: an executive program which executes a game; parameter information by which setting information such as an image resolution and a parental lock function or the like are determined; and content information of an application. The attribute information, such as the parameter information and the content information or the like, is recorded in a certain region of the recording medium 50.

The executive program is a program for advancing a game. The parameter information is data for determining an action of the game device 10, such as an image resolution of the game and information of access control age regarding a parental lock function, and so forth. The parameter information is used for setting an output resolution and for determining whether an executive program can be executed or not in view of a parental lock function, and so forth, by being read with the game device 10, for example, before starting the executive program. The content information is data including the title name and illustrative information of an application. The content information is used for displaying the game title in an icon form, or for displaying illustrative information to notify a user of the content of a game, on a menu screen of the game device 10. The content information may include a still image icon/a moving image icon as an icon to be displayed.

The switch 36 is an Ethernet (Ethernet is a registered trademark) switch and is a device which performs data transmission/reception to/from an external apparatus via a wired/wireless connection. The switch 36 is connected to a radio interface 38, and the radio interface 38 is connected to the game controller 40 having a wireless communication function via a communication protocol such as the Bluetooth (registered trademark) protocol or the IEEE 802.11 protocol or the like. The game controller 40 serves as an input unit where a user's input operation is performed. Operation information by a user is supplied to the main controller 100 through the radio interface 38, the switch 36, and the device controller 30.

The main controller 100 includes a multicore CPU which has a general-purpose processor core and multiple simple processor cores. Hereinafter, the general-purpose processor is referred to as a PPU (Power Processing Unit), and the remaining processor cores as SPUs (Synergistic-Processing Units). In the main controller 100, an operating system (hereinafter simply referred to as "OS") is executed, the OS providing a function and an environment for using the game device 10 efficiently, and controlling the overall device integratedly. The OS-hierarchy of the game device 10 in the present embodiment has three layers consisting of a user layer, a Kernel layer, and a Hypervisor layer from top. The software of the user layer, the Kernel layer, and the Hypervisor layer, unitedly function as the "OS" of the game device 10.

When turning on power by the power button 20, the system controller 24 supplies power to the main controller 100 and the output processor 104 via the device controller 30. When power being supplied to the main controller 100, the PPU at first executes a boot loader of the OS, then starts the Hypervisor layer. The PPU subsequently starts the Kernel layer of the OS and then the user layer thereof, thereby preparing to receive data supplied by the recording medium 50. Thus, the main controller 100 can execute game software.

The main controller 100 is provided with a memory controller connected to the main memory 102. The PPU has a register and is provided with a main processor as a main entity for executing operations so that the PPU assigns a task, which is a fundamental processing unit in an application to be executed, to each SPU. Alternatively, the PPU may execute a task by itself. The SPU has a register and is provided with a sub-processor as a main entity for executing operations, and a local memory as a local recording region. The main memory 102 and the local memory are structured as a RAM (Random Access Memory). The SPU has a dedicated DMA (Direct Memory Access) controller as a control unit and can perform a stream process on data by transferring data between the main memory 102 and the local memory, further can realize high-speed data transfer between a frame memory built-in the output processor 104 and the local memory.

The output processor 104 is connected to the output device 12 and outputs a video signal and a sound signal which are results of processing of an application. The output processor 104 is provided with a GPU (Graphics Processing Unit) by which an image processing function can be practiced. The GPU adopts an HDMI (High definition Multimedia Interface), thereby can perform digital output of a video signal without an analog conversion.

The game device 10 of the present invention has a function of reading out game software installed in the hard disk of the hard disk drive 34, into the main memory 102 or the local memory and executing it, in addition to a function of reading out game software recorded in the recording medium 50, into the main memory 102 or the local memory 102 and executing it. Hereinafter, a game read out from the recording medium 50 into the RAM is referred to as a "disk start game", while a game to be executed by being installed in a recording device such as a hard disk, is as an "installed game".

In the present embodiment, the recording medium 50 placed in the media drive 32 records software of a single disk start game, and software of one or more installed games. The installed game may be, for example, a trial version of a game. In the case, a game maker can distribute a trial version of another game to a user at a same time by selling a disk start game, leading to effective use of the recording medium 50 as a sales promotion tool. Without limiting to a trial version of a game, a product version of an installed game may be recorded in the recording medium 50. In the case where a game maker has been developing a series of games, an installable patch file of an old version of the game may be recorded in the recording medium 50 in which an update of the disk start game is recorded. When a user holds a plurality of game series, the user can readily acquire a patch file of the old version of the game without taking a time to download the patch file from a virtual game shop on the Internet. Similarly, the recording medium 50 may record game data, such as an installable item and an installable character. Thus, the recording medium 50 may hold an installer for software, a file, or data, which may be recorded in mixture thereof in the recording medium 50.

Figure 3:
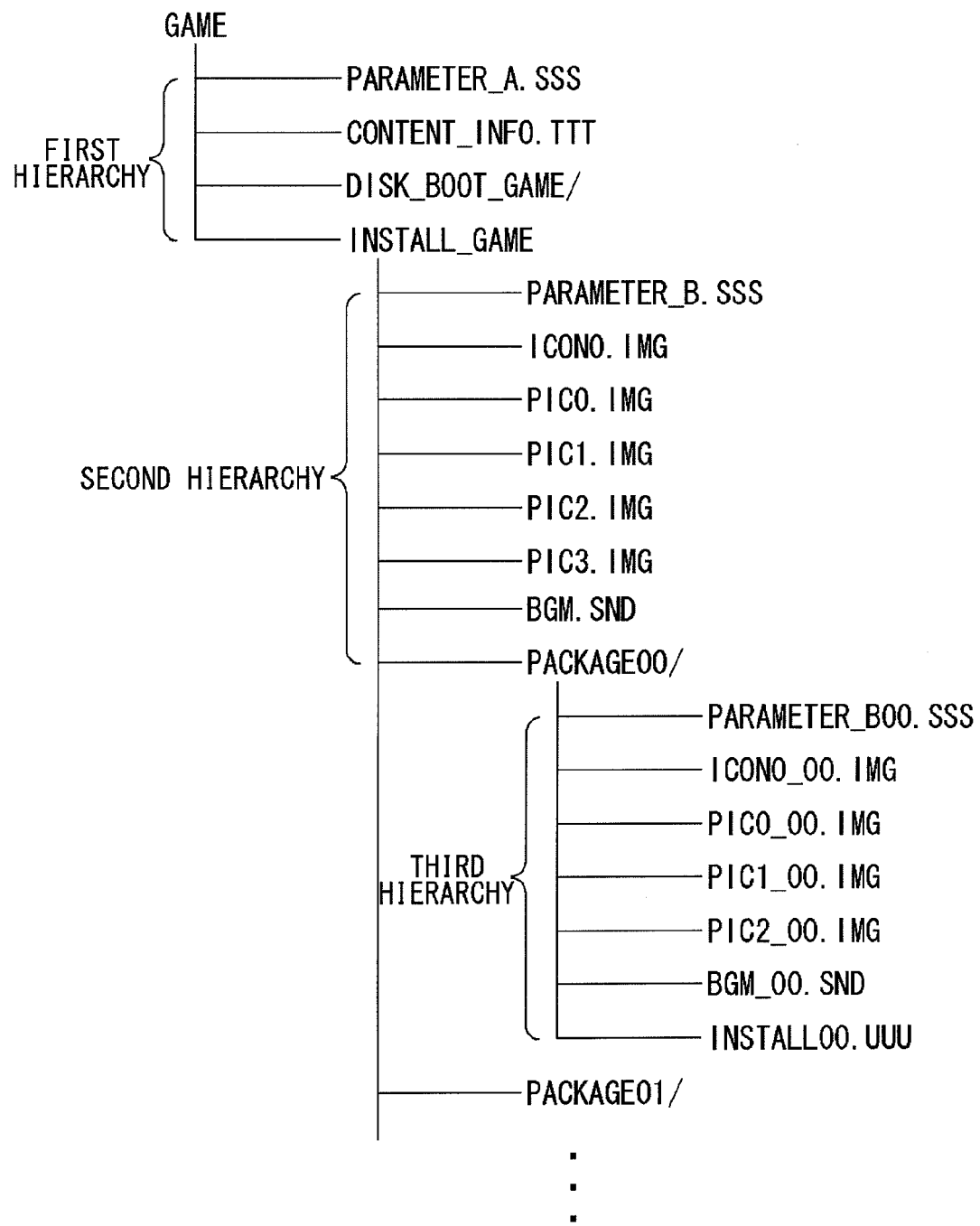
FIG. 3 is a diagram illustrating a directory structure of a recording medium.

FIG. 3 illustrates a directory structure of the recording medium. Hereinafter, with respect to the illustrated data, file, and directory, each hierarchy will be described. In the recording medium 50, software of a single disk start game and software of multiple installed games are recorded in the assigned regions, respectively.

<First Hierarchy>

(1) PARAMETER_A. SSS

This is a file in which the parameter information of a disk start game is described. This file includes the setting information such as an image resolution and a parental lock function or the like of the disk start game.

(2) CONTENT_INFO. TTT

This is a file in which the content information of the disk start game is described. This file includes a title name of the game, an illustrative image for the game, and an icon image or the like. The illustrative image and the icon image of the disk start game may be respectively located in the first hierarchy as data. Hereinafter, the illustrative image of the game will be sometimes referred to as a "front image", because it is arranged in front of a background image.

(3) DISK_BOOT_GAME/

This is a directory in which an executive program of a disk start game is recorded.

(4) INSTALL_GAME/

This is a directory in which all programs, files, and data, which are regarding the installed games, are recorded.

<Second Hierarchy>

While some of the programs and the files included in the "DISK_BOOT_GAME/" are present in the second hierarchy, they are excluded from FIG. 3. In the sub-hierarchy of the directory of "INSTALL_GAME", regions are formed in which a program, a file, and data included in software of an installed game, are recorded, respectively.

(1) PARAMETER_B. SSS

This is a file in which the parameter information common in the installed games is described.

(2) ICON 0. IMG

This is an icon image indicating that multiple installed games are present. An icon for identifying an individual installed game is included in the "PACKAGE Directory".

(3) PIC 0. IMG

This is an illustrative image with a high-resolution.

(4) PIC 1. IMG

This is a first background image, and used as a background image when an operation for selecting an icon image (GAME/INSTALL_GAME/ICON 0. IMG) is performed on a menu screen displayed on the display.

(5) PIC 2. IMG

This is an illustrative image with a standard resolution.

(6) PIC 3. IMG

This is a second background image, and used as a background image when an operation for determining an icon image (GAME/INSTALL_GAME/ICON 0. IMG) is performed on a menu screen displayed on the display.

(7) BGM. SND

This is music data of BGM.

(8) PACKAGE 00/

This is a directory in which all programs, files, and data, which are regarding an installed game 00, are recorded. Similarly, "PACKAGE 01/" is a directory in which all programs, files, and data, which are regarding an installed game 01, are recorded.

<Third Hierarchy>

(1) PARAMETER_B 00. SSS

This is a file in which the parameter information of the installed game 00 is described. This file includes an image resolution of the installed game 00.

(2) ICON 0_00. IMG

This is an icon for identifying the installed game 00.

(3) POC 0_00. IMG

This is an illustrative image with a high resolution for the installed game 00.

(4) PIC 1_00. IMG

This is a background image of the installed game 00.

(5) PIC 2_00. IMG

This is an illustrative image with a standard resolution for the installed game 00.

(6) BGM_00. SND

This is the music data of the BGM of the installed game 00.

(7) INSTALL 00. UUU

This is an executive program of the installed game 00, and is executed by being installed in the hard disk to start.

Figure 4:
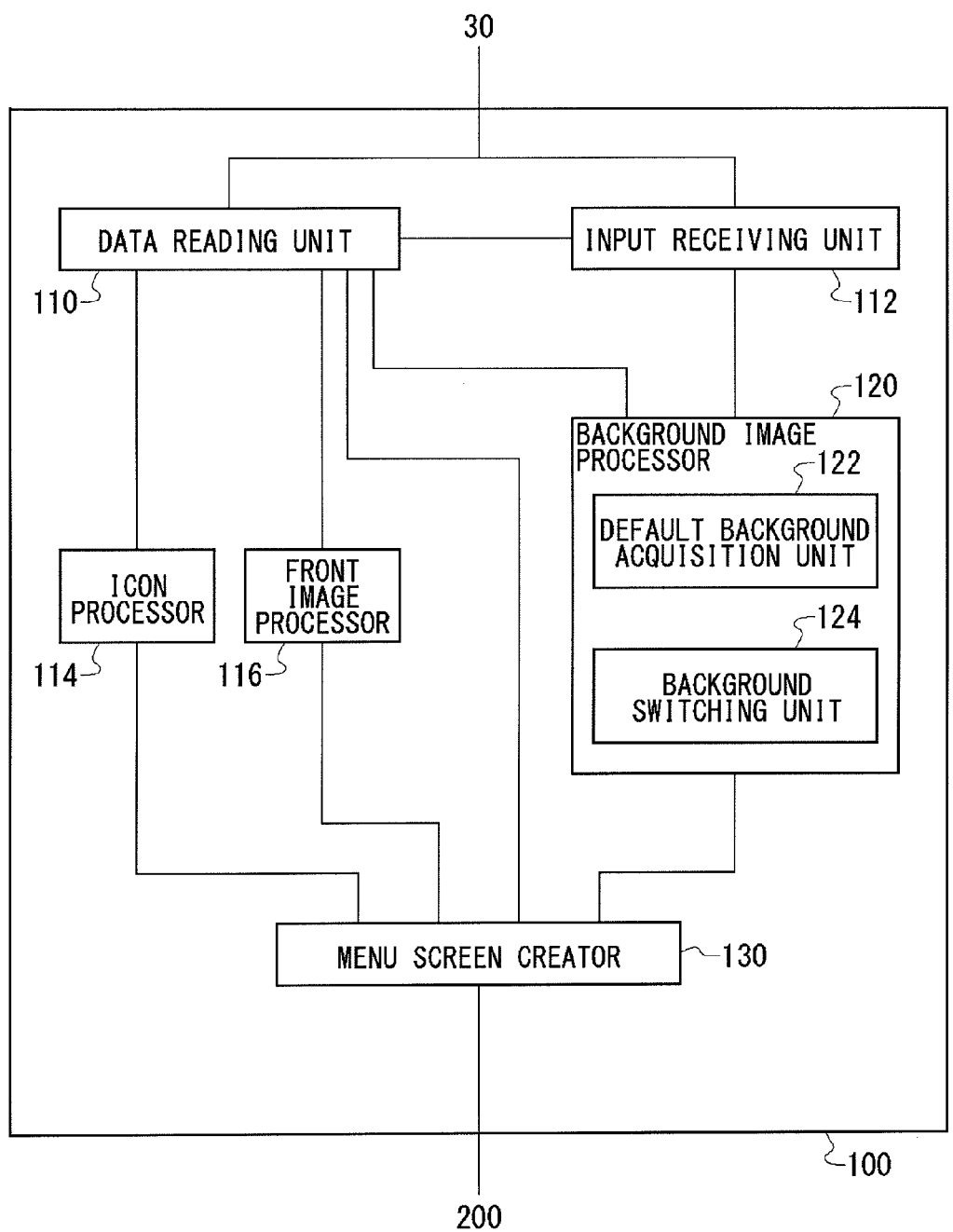
FIG. 4 is a diagram illustrating an interior structure of a main controller.

FIG. 4 illustrates an interior structure of the main controller 100. The main controller 100 includes a data reading unit 110, an input receiving unit 112, an icon processor 114, a front image processor 116, a background image processor 120, and a menu screen creator 130. The background image processor 120 includes a default background acquisition unit 122 and a background switching unit 124.

Each element illustrated as a functional block performing various processing in FIG. 4, can be practiced by a CPU (Central Processing Unit), a memory, and other LSIs, in terms of hardware, and be practiced by a program or the like loaded in the memory in terms of software. As stated before, the main controller 100 is provided with the single PPU and the multiple SPUs, and the PPU and the SPUs can structure each functional block either individually or in collaboration. Therefore, a person skilled in the art should appreciate that there are many ways of accomplishing these functional blocks in various forms in accordance with the components of hardware only, software only, or the combination of both.

In the game system 1 of the present embodiment, a user installs software of an installed game recorded in the recording medium 50 into the hard disk by using the game controller 40, while watching the GUI (Graphical User Interface) displayed on the display of the output unit 12. Thus, the user can enjoy a trial version of the installed game. According to the present embodiment, user's interest in the installed game can be maintained to be high, by devising an image to be displayed on the display of the output device 12 when the user installs the software of the game.

The data reading unit 110 has a function of reading out data from the recording medium 50 with the use of the media drive 32 through the device controller 30. In the present embodiment, the data reading unit 110 reads an icon image, a front image, and a background image from the recording medium 50. The data reading unit 110 also has a function of reading out a default background image held in a nonvolatile memory (not shown) or the hard disk drive 34. The processing of reading out data by the data reading unit 110 is carried out when the recording medium 50 is placed in the media drive 32 and recognized, or when an operation for selecting or determining an icon on the display is performed by a user.

The input receiving unit 112 receives the operation information inputted from the game controller 40. Specifically, the input receiving unit 112 receives an operation for selecting an icon and an operation for determining an icon by a user, and transfers the information indicating the operation has been made, to the data reading unit 110 and the background image processor 120.

The icon processor 114 acquires the icon image read out by the data reading unit 110, and supplies it to the menu screen creator 130. Immediately after the recording medium 50 is placed in the media drive 32, the data reading unit 110 reads out an icon image for a disk start game from the CONTENT_INFO. TTT in the first hierarchy, and an icon image (GAME/INSTALL_GAME/ICON 0. IMG) for indicating the presence of software of a game which can be installed, from the second hierarchy, with reference to FIG. 3. When an operation for determining an icon image (GAME/INSTALL_GAME/ICON 0. IMG) is performed by a user, the data reading unit 110 reads out the icon image recorded in each PACKAGE directory.

The data reading unit 110 reads out not only an icon image included in the recording medium 50 but also other icon image which can be processed by the game device 10, from the nonvolatile memory or the hard disk drive 34. The icon processor 114 supplies the icon image read out to the menu screen creator 130.

The front image processor 116 acquires a front image (also referred to as an "illustrative image") read out by the data reading unit 110, and supplies it to the menu screen creator 130. The data reading unit 110 reads a front image (GAME/INSTALL_GAME/PIC 0. IMG or GAME/INSTALL_GAME/PIC 2. IMG) from the second hierarchy, and a front image (GAME/INSTALL_GAME/PACKAGE 00/PIC 0_00. IMG or GAME/INSTALL_GAME/PACKAGE 00/PIC 2_00. IMG) from the third hierarchy, with reference to FIG. 3, as needed. The front image processor 116 supplies the front images read out to the menu screen creator 130.

The background image processor 120 acquires a background image read out by the data reading unit 110, and supplies it to the menu screen creator 130. When the recording medium 50 is placed in the media drive 32 and recognized, the data reading unit 110 reads out a default background image from the nonvolatile memory or the hard disk drive. The default background image is set so as to be a background of a menu screen of the game device 10, and structures a background image of the menu screen. The default background acquisition unit 122 supplies the default background image read out to the menu screen creator 130.

When receiving information of an operation for selecting an icon by a user, the data reading unit 110 reads out a first background image and a second background image recorded in the recording medium 50, and supplies them to the background image processor 120. The first background image is the "GAME/INSTALL_GAME/PIC 1. IMG", and the second background image is the "GAME/INSTALL_GAME/PIC 3. IMG", which are illustrated in FIG. 3. The second background image may be read out when receiving information of an operation for determining an icon by a user. When the input receiving unit 112 receives information of an operation indicating that an operation for selecting an icon (GAME/INSTALL_GAME/ICO 0. IMG), which indicates the game software that can be installed, is selected in the menu screen having a default background image, the background switching unit 124 directs the menu screen creator 130 to switch the default background image to the first background image. When receiving information indicating that an operation for determining an icon image (GAME/INSTALL_GAME/ICON 0. IMG) is performed on the menu screen having the first background image, the input receiving unit 112 directs the menu screen creator 130 to switch the first background image to the second background image.

The first background image and the second background image are created by a game maker and the backgrounds images express the ethos of the game. Therefore, when installing a trial version of game software, user's interest in the game software can be maintained to be high, by letting the user watch the first background image and the second background image, not letting the user watch the default background image prepared in the game device 10 beforehand. The dame device 10 of the present embodiment can guide a user to the virtual world of a game by displaying a background image recorded in the recording medium 50, while an input operation is being performed by a user.

The menu screen creator 130 creates a menu screen on a background image supplied by the background image processor 120, in which an icon image read out from the recording medium 50 and another icon image which can be processed by the game device 10 are arranged. The menu screen creator 130 supplies the created menu screen to the output device 12, and the output device 12 displays the menu screen on the display. Hereinafter, processes done by the main controller 100 will be described along with transition of menu screens.

Figure 5:
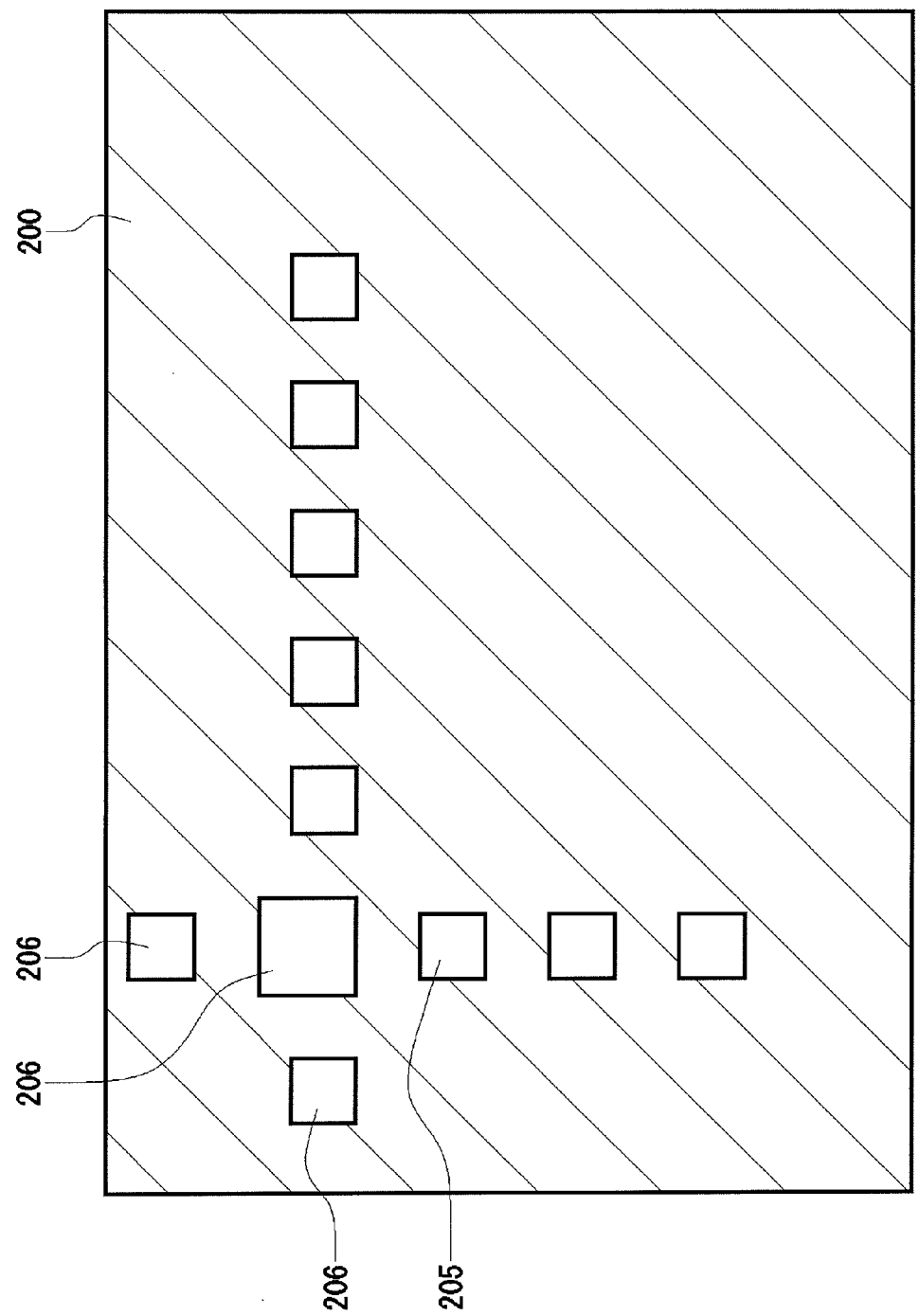
FIG. 5 is a diagram illustrating a menu screen displayed on a display.

FIG. 5 illustrates a menu screen displayed on the display. The menu screen creator 130 creates a menu screen on a default background image supplied by the default background acquisition unit 122, in which multiple icon images 206 identifying processing executable in the game device 10, are arranged in a cross array consisting of a vertical direction and a horizontal direction, then supplies it to the output processor 104. When creating a menu screen illustrated in FIG. 5, the recording medium 50 is not yet placed in the media drive 32.

A user can perform an operation for selecting or determining an icon displayed on a menu screen, by operating the game controller 40 so that a desired icon is transferred to the selection region 205 by scrolling. An operation for selection means transferring an icon to the selection region 205, and an operation for determination means making processing associated with the icon located in the selection region 205, be executed by operating a button or the like for the icon. Hereinafter, locating an icon in the selection region 205 is sometimes referred to as "adjusting a focus."

Figure 6:
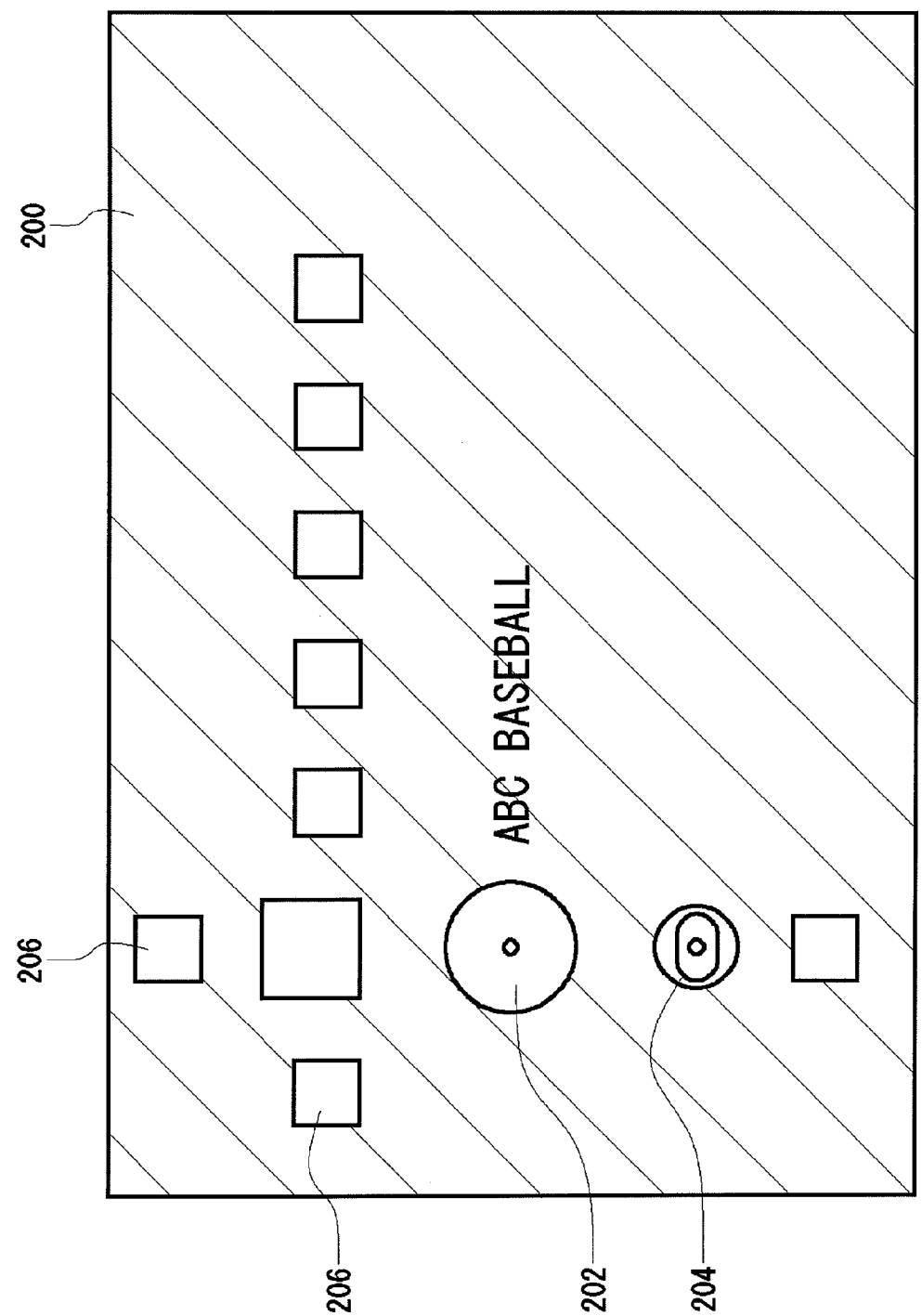
FIG. 6 is a diagram illustrating a menu screen displayed on the display when a recording medium is placed in a media drive.

FIG. 6 illustrates a menu screen displayed on the display when the recording medium is placed in the media drive. When a user places the recording medium 50 in the media drive 32, the media drive 32 detects an ID number held in a certain recording region to determine whether the recording medium 50 is authentic or not. When the recording medium 50 is authentic, upon recognizing that a disk start game and an installed game are recorded in the recording medium 50, the data reading unit 110 reads out the icon image for the disk start game and the first icon image (GAME/INSTALL_GAME/ICON 0. IMG) indicating the presence of the game software capable of being installed, and supplies them to the icon processor 114. When acquiring the two icon images from the recording medium 50, the icon processor 114 supplies them to the menu screen creator 130.

The menu screen creator 130 creates a menu screen on a default background image 200, in which the icon image 202 for the disk start game and the first icon image 204 are arranged along with another icon image 206. A menu screen illustrated in FIG. 6 is created automatically, without operation information by a user being required. In this embodiment, the title of the game identified by the icon image 202 for the disk start game is "ABC Base ball", which is read out from the recording medium 50 by the data reading unit 110 and supplied to the menu screen creator 130.

Figure 7:
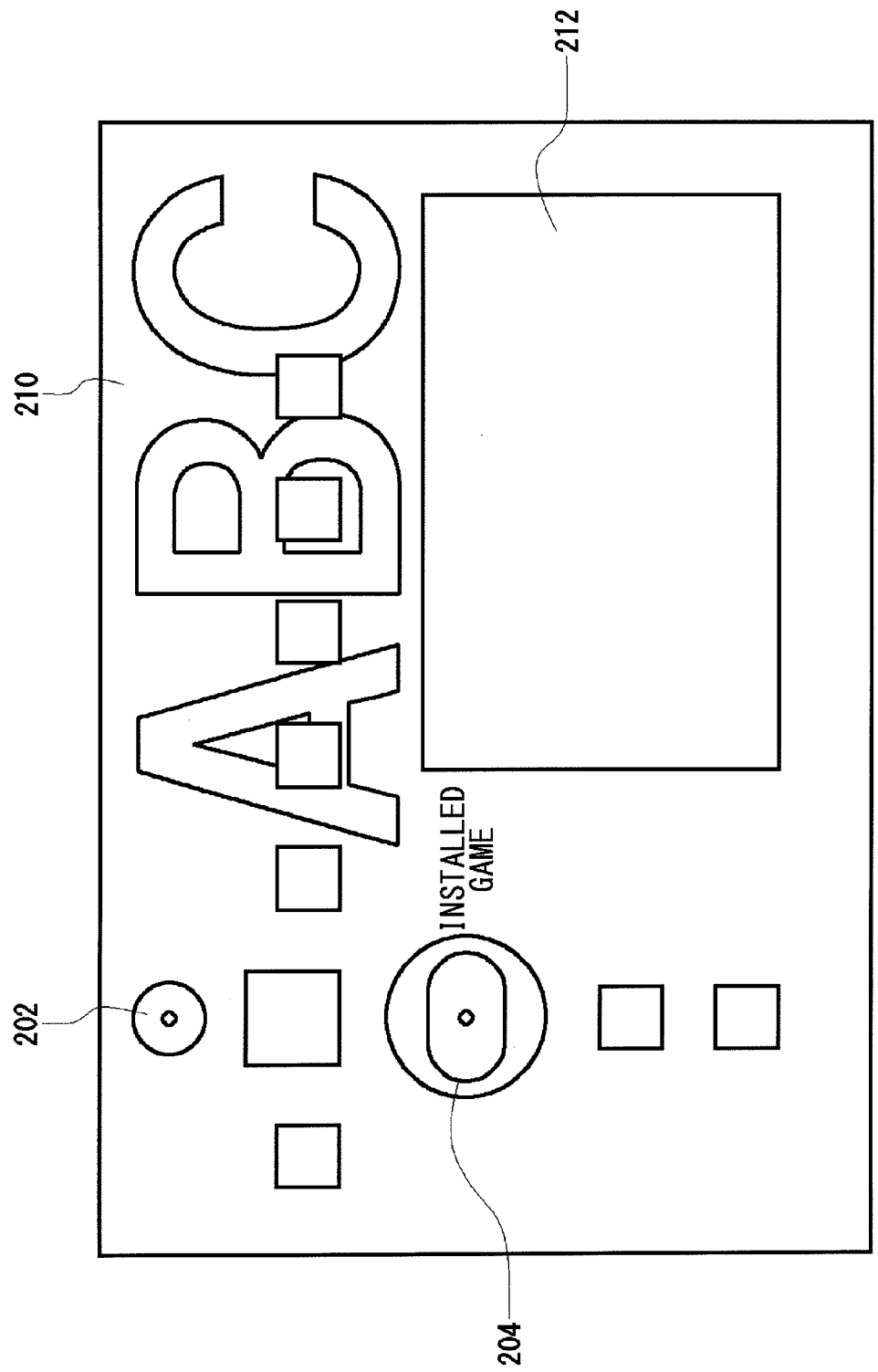
FIG. 7 is a diagram illustrating a menu screen displayed on the display when an operation for selecting a first icon image is performed.

FIG. 7 is a diagram illustrating a menu screen displayed on the display when an operation for selecting the first icon image is performed. When a user places the focus on the first icon image 204 on the menu screen, the input receiving unit 112 receives operation information indicating that an operation for selecting the first icon image 204 has been performed on the menu screen and notifies the data reading unit 110 and the background image processor 120 of the operation information. The title "Installed Game" is displayed in the vicinity of the first icon image 204, the title indicating that the first icon image 204 is an icon for installing multiple installed games. The title information is read out from the recording medium 50 by the data reading unit 110 and is supplied to the menu screen creator 130.

When receiving a notification of an operation for selection, the data reading unit 110 reads out the first background image (GAME/INSTALL_GAME/PIC 1. IMG) and the second background image (GAME/INSTALL_GAME/PIC 3. IMG) from the recording medium 50, and supplies them to the background image processor 120. When receiving a notification of an operation for selection, the background switching unit 124 recognizes that a background image should be switched to another, and by receiving the first icon image, recognizes a background image to switch to. At the time, the second background image is held in the RAM such as the main memory 102. The background switching unit 124 directs the menu screen creator 130 to switch the background image from the default background image to the first icon image, as well as supplies the first icon image to the menu screen creator 130. The menu screen creator 130 switches the default background image to the first background image 210. The first background image 210 is an image where the "ABC" are outlined characters on a colored background at the top right of the screen, as illustrated.

When receiving a notification of an operation for selection, the data reading unit 110 reads out a front image (GAME/INSTALL_GAME/PIC 0. IMG or GAME/INSTALL_GAME/PIC 2. IMG) from the recording medium 50 and supplies it to the front image processor 116. The front image processor 116 supplies it to the menu screen creator 130 after performing necessary processing such as adjusting the size thereof on the front image. Thus, the menu screen creator 130 creates a menu screen where the front image 212 is arranged on the first background image 210. The front image 212 may include a general illustrative description about an installed game included in the recording medium 50.

Figure 8:
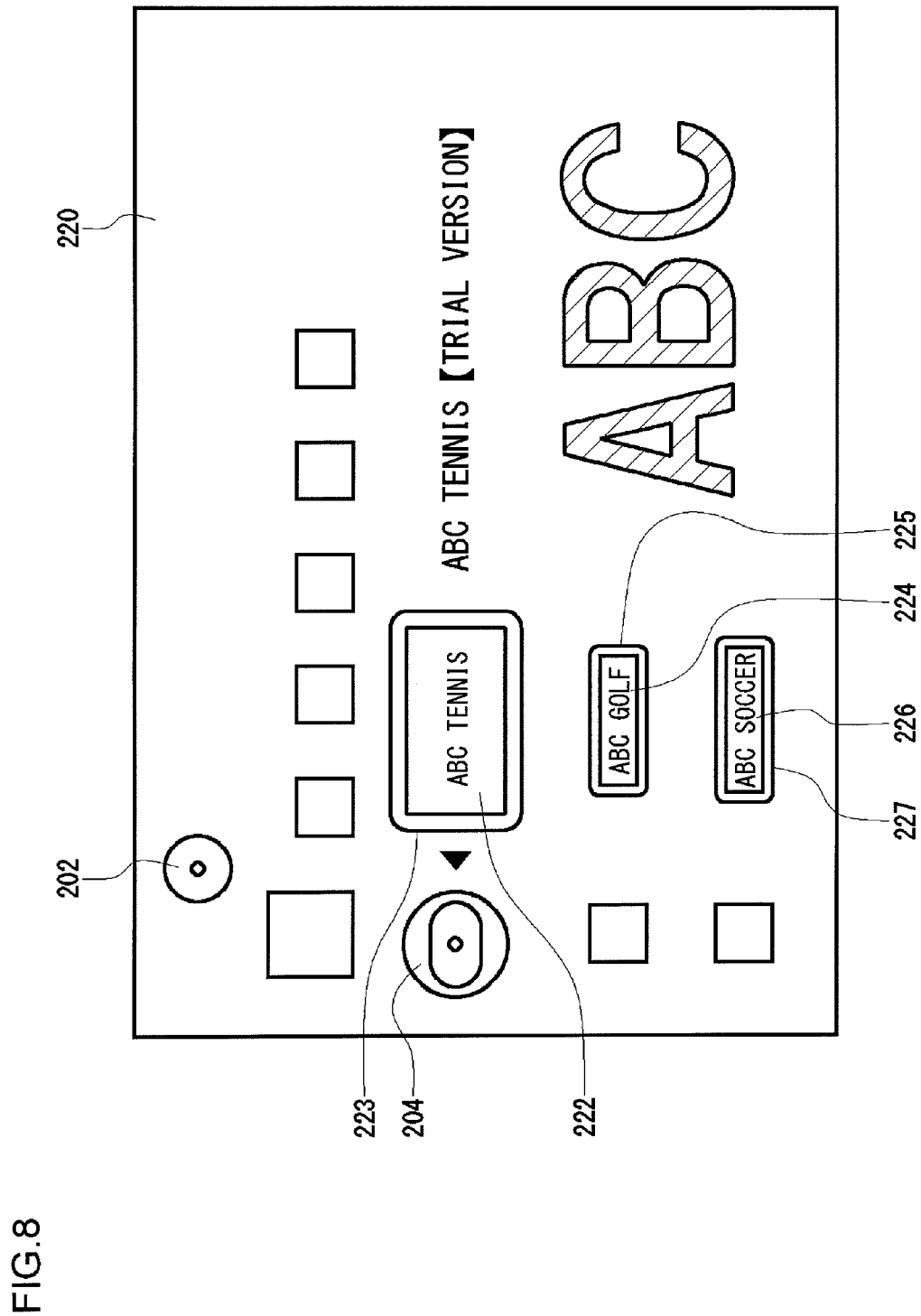
FIG. 8 is a diagram illustrating a menu screen displayed on the display when an operation for determining the first icon image is performed.

FIG. 8 is a diagram illustrating a menu screen displayed on the display when an operation for determining the first icon image is performed. When a user presses a predetermined button of the game controller 40 while placing a focus on the first icon image 204 on a menu screen, the input receiving unit 112 receives operation information indicating that an operation for determining the first icon image 204 has been performed on the menu screen, and notifies the data reading unit 110 and the background image processor 120 of the operation information.

When receiving the notification of an operation for determination, the background switching unit 124 recognizes that a background image should be switched. The background switching unit 124 directs the menu screen creator 130 to switch the background image from the first background image to the second background image, as well as supplies the second background image held in the RAM to the menu screen creator 130. The menu screen creator 130 switches the first background image to the second background image 220. The second background image 220 is an image where the outlined "ABC" characters on the colored background are hatched at the bottom right of the screen, as illustrated.

When receiving a notification of an operation for determination, the data reading unit 110 reads out the second icon identifying game software (GAME/INSTALL_GAME/PACKAGE 00/ICON 0_00. IMG) capable of being installed from the recording medium 50, and supplies it to the icon processor 114. In the case where multiple installed games are included in the recording medium 50, the same number of the second icon images as that of the installed games are read out. The icon processor 114 supplies the second icon image to the menu screen creator 130. Thus, the menu screen creator 130 creates a menu screen, in which the second icon images 222, 224, and 226 are arranged on the second background image 220. An installed game cannot be executed until being installed in the hard disk, thus the second icon images 222, 224, and 226 are arranged in a row different from the cross array of icons in the menu screen. When being installed in the hard disk, each of the second icon images 222, 224, and 226 is displayed on the menu screen as an icon image 206 for starting an installed game.

The icon processor 114 may perform predetermined image processing for notifying a user that installation in the hard disk is possible, on the second icon images 222, 224, and 226. In FIG. 8, each of the second icon images 222, 2245, and 226 is covered with capsule images 223, 225, and 227 which copy capsules. With this, a user can recognize that the game software identified by the second icon images 222, 224, and 226 can be installed, leading to smooth installation processing. For the game software of which the installation in the hard disk is completed, a capsule image may be removed therefrom. Such image processing by the icon processor 114 makes the second icon image be utilized efficiently, and allows a game maker not to have to create an icon image different from the second icon image notifying that installation is possible.

User's interest in a game can be maintained to be high by displaying a background image recorded in the recording medium 50 all the time while accessing the recording medium 50 until installation is executed. In the present embodiment, trial versions of ABC series software featuring various sports game are provided to a user, and including the characters of "ABC" in a background image can make the user be aware of ABC series games strongly. Thus, according to the game system 1 of the present embodiment, a game maker can be provided with an opportunity whereby the maker strategically creates a background image capable of enhancing user's buying intention for a trial version of software.

Figure 9:
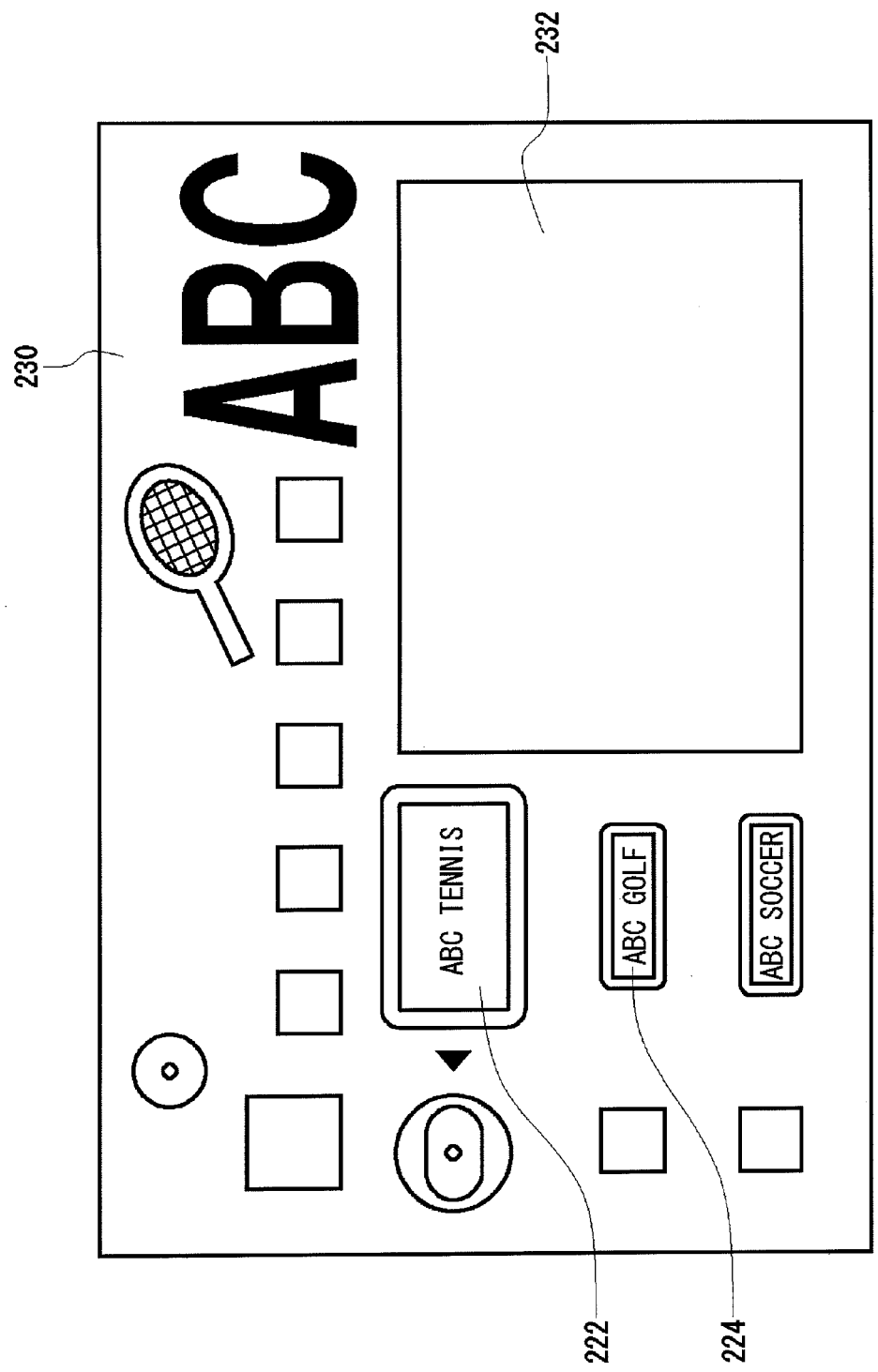
FIG. 9 is a diagram illustrating a menu screen displayed on the display when an operation for selecting a second icon image is performed.

FIG. 9 illustrates a menu screen displayed on the display when an operation for selecting a second icon image is performed. When a user places a focus on the second icon image 222 on the menu screen, the input receiving unit 112 receives operation information indicating that an operation for selecting the second icon image 222 has been performed on the menu screen, and notifies the data reading unit 110 and the background image processor 120 of the operation information. When an operation for selecting the second icon image is performed, the data reading unit 110 reads out data from the corresponding PACKAGE directory. Herein, an installed game of "ABC Tennis" is stored in a recording region of the GAME/INSTALL_GAME/PACKAGE 00/.

When receiving a notification of an operation for selection, the data reading unit 110 reads out the third background image (GAME/INSTALL_GAME/PACKAGE 00/PIC 1_00. IMG), and supplies it to the background image processor 120. The background switching unit 124 recognizes that a background image should be switched by receiving the notification of an operation for selection, and also recognizes a background image to switch by receiving the third background image. The background image switching unit 124 directs the menu screen creator 130 to switch the background image from the second background image to the third background image, as well as supplies the third background image to the menu screen creator 130. The menu screen creator 130 switches the second background image to the third background image 230. The third background image 230 is black "ABC" characters and an racket image at the top right of the screen, as illustrated.

When receiving a notification of an operation for selection, the data reading unit 110 reads out a front image (GAME/INSTALL_GAME/PACKAGE 00/PIC 0_00. IMG or GAME/INSTALL_GAME/PACKAGE 00/PIC 2_00. IMG) from the recording medium 50, and supplies it to the front image processor 116. The front image processor 116 supplies it to the menu screen creator 130 after performing necessary processing, such as adjusting the size thereof, on the front image. Thus, the menu screen creator 130 creates a menu screen where the front image 232 is arranged on the third background image 230. An illustrative description may be displayed in the front image 232.

The case where a user places a focus on the second icon image 222 by operating an icon on a menu screen, has been described above; however, a focus may be automatically placed on the second icon image 222, when a menu screen illustrated in FIG. 8 is displayed upon an operation for determining the first icon image 204 being performed. In the case, an operation for selecting the second icon image 222 is performed at the time when an operation for determining the first icon image 204 is performed.

In the game system 1, it takes about several seconds for the data, such as an icon image and a background image, to be read out, because the data is held in the recording medium 50. In particular, a background image is larger in the amount of data, therefore takes a longer time to be read in comparison with an icon image. In the case where an operation for selecting the second icon image 222 is automatically performed at the time when an operation for determining the first icon image 204 is performed, when switching the first background image 210 to the third background image 230 directly, the first background image 210 remains unswitched for a while. When an operation for selecting the second icon image 222 is performed, it is preferable that the first background image 210 is switched to another background image then followed by a switch to the third background image 230, in order to notify a user that an operation for selecting the second icon image 222 is under processing.

At the time, it is possible that the switch is performed via a default background image 200 provided on the side of the game device 10; however, the atmosphere thereof is different from the first background image 210, which is considered to sometimes make a user feel uncomfortable, even for about several seconds. Therefore, it is recommendable that the second background image 220, which is held in the RAM, is temporarily displayed then followed by the third background image 230 after the third background image 230 has been completed to be read out. This way can expedite the install processing, while maintaining the ethos of the game without making a user feel uncomfortable.

In a menu screen illustrated in FIG. 9, when placing a focus on the second icon image 224, the second background image 220 is similarly displayed during the time when the transition of images from the third background image 230 to the background image of "ABC Golf" is continuing. Thus, it can be possible for a user to continue an operation for selecting an icon image while maintaining the ethos of the game, as stated above.

Figure 10:
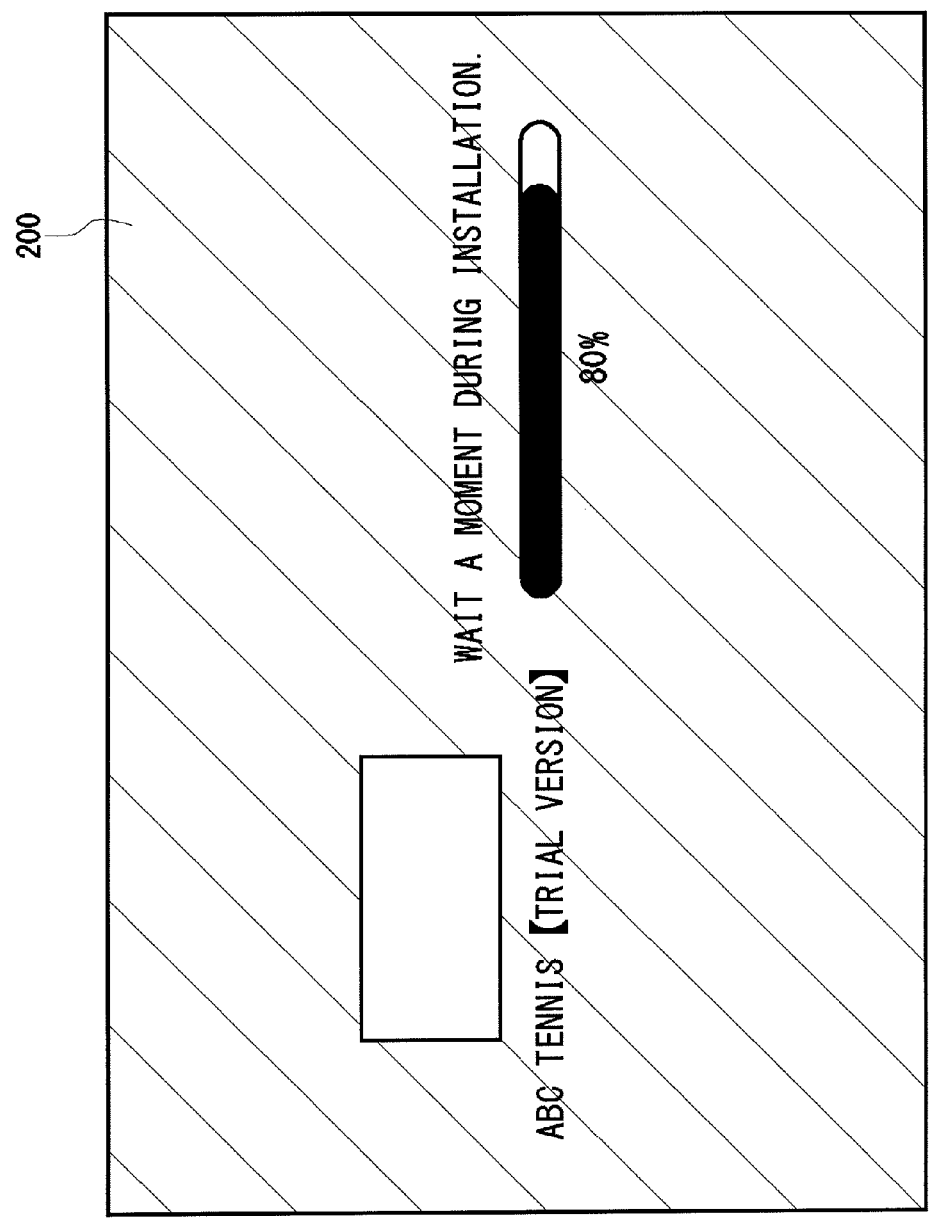
FIG. 10 is a diagram illustrating a screen during installation.

FIG. 10 illustrates a screen during installation. When a user presses a predetermined button of the game controller 40 while placing a focus on the second icon image 222 on the menu screen, the input receiving unit 112 receives operation information indicating that an operation for determining the second icon image 222 is performed on the menu screen, and communicates it to an install processor (not shown). The install processor installs (GAME/INSTALL_GAME/PACKAGE 00/INSTALL 00. UUU), which corresponds to the second icon image 222, in the hard disk. In order to make a user recognize that the processing on the part of the game device 10 is performed during installation, the background image processor 120 supplies a default background image to the menu screen creator 130 so that the menu screen creator 130 sets the default background image as a background.

When the installation is completed, the menu screen creator 130 creates a menu screen illustrated in FIG. 9. At the time, the icon processor 114 may perform image processing in which the capsule image 223 covering the second icon image 222 is deleted to indicate a user that the game corresponding to the second icon image 222 has been installed.

The present invention has been described based on the embodiments. These embodiments are intended to be illustrative only and it will be obvious to those skilled in the art that various modifications to constituting elements and processes could be developed and that such modifications are also within the scope of the present invention. For example, In the above embodiments, an icon is located in the selection region 205 to perform an operation for selecting an icon; however, it may be possible for a user to select an icon with the use of a pointing device such as a mouse pointer.

In the above embodiments, the case where software of a disk start game and software of an installed game are recorded in the recording medium 50, are described; however, only software of an installed game may be recorded in the recording medium 50. The application of the present invention is not limited to cases where game software is installed. The invention also helps the ethos of a game to be appreciated by a user switching the game to play, by using a background image provided by the game software played prior to the switching or the game software played after the switching, without using the background image provided by the game device 10.

In the above embodiments, processing of switching a background image, when installing a trial version of game soft from the recording medium 50, has been described; however, the above processing can also be adopted when displaying an icon of "ABC" series on a menu screen. For example, it is assumed that the directory structure of the hard disk includes the second hierarchy and the third hierarchy illustrated in FIG. 3, and software of "ABC Tennis" is held in the PACKAGE 00 directory, and software of "ABC Golf" in the PACKAGE 01 directory. On the menu screen, an icon expressing generally the presence of ABC series games, such as the first icon image 204 in FIG. 7, is displayed. When an operation for determining the icon is performed and an icon for "ABC Tennis" is selected, a menu screen having a background image common in the ABC series (for example, the second background image 220) is displayed, then a menu screen having a background image 230 of the "ABC Tennis" (for example, see FIG. 9) is displayed. Subsequently, when an icon of the "ABC Golf" is located in the selection region 205 with the icon being scrolled by a user, the background image common in the ABC series is displayed on the display, before the background image of the "ABC Golf" is displayed. Thus, it can be possible to continue providing a user with the ethos of the games of the ABC series, and to notify a user that a game now selected is to be switched.

In the above embodiments, the case where the first background image 210 and the second background image 220 are used, has been described; however, on a menu screen illustrated, for example, in FIG. 9, when placing a focus on the second icon image 224, the first background image 210 may be displayed during the time when the transition of images from the third background image 230 to the background image of the "ABC Golf". By using the first background image 210 as with the second background image 220, the ethos of the game can be maintained when a focus moves among icons of the game, even if the second background image 220 is not present. In addition, when the second background image 220 cannot be searched for in the directory despite a desire for using the second background image 220, the first background image 210 can be used instead.

What is claimed is:

1. An information processor which can install application software from a recording medium placed in a drive device comprising:

an input receiving unit which receives operation information by a user;

an icon processor which acquires a first icon image;

a background image processor which acquires a background image; and a menu screen creator for displaying, on a default background image, a menu screen on which the first icon image and another icon image are arranged, wherein, when the input receiving unit receives operation information indicating an operation for selecting the first icon image is performed on the menu screen, the background image processor directs the menu screen creator to switch the default background image to a first background image acquired by the background image processor, and, when the input receiving unit receives operation information indicating an operation for determining the selected first icon image is performed on the menu screen, the background image processor directs the menu screen creator to switch the first background image to a second background image acquired by the background image processor, wherein the icon processor acquires the first icon image indicating the presence of the application software which can be installed, from the recording medium, and the background image processor acquires the first background image and the second background image from the recording medium.

2. The information processor according to claim 1, wherein the default background image is memorized in a nonvolatile memory or a memory device of the information processor.

3. The information processor according to claim 2, wherein, when the input receiving unit receives operation information indicating an operation for determining the first icon image is performed on the menu screen, the icon processor acquires a second icon image identifying application software which can be installed, from the recording medium, and the menu screen creator creates a menu screen on the second background image, in which the second icon image acquired is arranged.

4. The information processor according to claim 3, wherein the icon processor performs predetermined image processing for notifying a user that installation is possible, on the second icon image acquired.

5. A program stored on a non-transitory computer-readable medium for allowing a computer to execute:

a function for displaying a first icon image when the non-transitory computer-readable medium is placed in a drive device;

a function for displaying a first background image on a display which is used as a background image when an operation for selecting the first icon image is performed; and a function for displaying a second background image which is used instead of the first background image when an operation for determining the selected first icon on the display is performed, wherein the first icon image identifies the presence of application software which can be installed from the non-transitory computer-readable medium and, wherein the first icon image, the second icon image, the first background image, and the second background image are acquired from the non-transitory computer readable medium.

\* \* \* \* \*